United States Patent [19]

Cather, Jr.

[11] Patent Number: 4,504,067
[45] Date of Patent: Mar. 12, 1985

[54] HIGH PRESSURE SHAFT SEAL WITH LOW-FRICTION LIP LINER

[75] Inventor: Douglas A. Cather, Jr., Gastonia, N.C.

[73] Assignee: Garlock Inc., Longview, Tex.

[21] Appl. No.: 615,159

[22] Filed: May 30, 1984

[51] Int. Cl.³ .............................................. F16J 15/34
[52] U.S. Cl. ..................... 277/153; 277/50; 277/166
[58] Field of Search ................. 277/84, 152, 153, 166, 277/165, 227–229, 50, 47

[56] References Cited

U.S. PATENT DOCUMENTS

| | | | |
|---|---|---|---|
| 2,804,324 | 8/1957 | Stallings | 277/153 |
| 2,804,325 | 8/1957 | Riesing | 277/153 |
| 3,495,843 | 2/1970 | Andersen et al. | 277/153 X |
| 4,131,285 | 12/1978 | Denton et al. | 277/152 X |

FOREIGN PATENT DOCUMENTS

| | | | |
|---|---|---|---|
| 585488 | 2/1947 | United Kingdom | 277/47 |
| 1478273 | 6/1977 | United Kingdom | 277/153 |

*Primary Examiner*—Robert S. Ward
*Attorney, Agent, or Firm*—Richard W. Watson

[57] ABSTRACT

A lip type bonded shaft seal adapted to seal against substantial fluid pressure. The seal includes a low-friction liner bonded to a sealing portion of an elastomeric element which is bonded to a U-shaped metal shell which helps to support the sealing lip portion. The low-friction liner is not bonded to any part of the metal shell.

16 Claims, 3 Drawing Figures

HIGH PRESSURE SHAFT SEAL WITH LOW-FRICTION LIP LINER

FIELD OF THE INVENTION

This invention relates to lip seals for relatively rotatable machine elements and more particularly to an improved lip seal of relatively simple construction and capable of operating in a relatively high pressure environment.

BACKGROUND OF THE INVENTION

A wire variety of lip type seals have been used in association with relatively rotatable machine elements for many years. Such seals have generally provided satisfactory and long-lived service in those applications involving little or no fluid pressure to be retained. However, as the contained fluid pressure increases, functional problems begin to arise in seal operation. Among the more common problems are accelerated lip wear and lip distortion. In more extreme cases, lip distortion can actually go so far as to fracture the sealing element or to allow the lip to turn inside out.

Numerous attempts have been made to overcome these and other problems with a variety of seal designs. Some measure of success has been achieved, but the results have not been fully satisfactory. For example, a variety of back-up members have been employed to prevent or reduce lip distortions. Also, low-friction lip liners have been utilized to reduce excessive lip wear. Examples of previous designs with back-up members are illustrated and described in U.S. Pat. Nos. 3,254,898, 3,495,843 and 4,300,778. Low-friction lip liners are shown in U.S. Pat. Nos. 3,495,843 and 4,289,321. While each of these prior art designs may provide some service improvement in high pressure sealing, each suffers from one or more shortcomings such as complex and expensive design, inability to function properly in low pressure applications or inability to accommodate shaft runout.

U.S. Pat. No. 3,495,843 illustrates a lip type seal having a low-friction resin liner and a backup piece designed to reduce lip distortion and/or reversal upon exposure to high pressure. However, the back-up piece or insert is a separate element which must be fabricated separately, which must be snapped into place and which can separate in service unless it is positively retained as by the plate shown in FIG. 2. It is also significant that the liner does not extend along the whole surface of the elastomeric element and there is no contact between the shell and the liner. The flex characteristics change abruptly at the end of the liner and thus may concentrate stresses in this area and bring about premature failure, particularly where there may be any degree of shaft runout.

U.S. Pat. No. 4,289,321 describe a lip type pressure seal having a PTFE liner. However, this is a dual lip seal and is designed to function between two (2) areas of pressure and to allow purging of pressure in one direction but not in the other. Again, there is no contact between the liner and the shell.

U.S. Pat. No. 3,254,898 describes another lip type pressure seal which appears to be similar to that of the present invention but which is significantly different in several respects. Among these differences, perhaps the most significant is the fact that there are really two (2) sealing lips and there is no bond between them thus allowing them to function independently of one another. Further, the old structure is of the assembled type and rather complex as compared to the present invention.

Other differences between these prior art designs and the present invention will be apparent to those skilled in the seal art.

SUMMARY OF THE INVENTION

In order to overcome the above-recited and other shortcomings, the present invention provides a simplified seal design having a metal shell member, an elastomeric lip forming member or body and a low-friction liner layer bonded to the surface of the lip forming member and extending between portions of the elastomeric member and the shell member.

It is a primary object of the invention to provide a lip type shaft seal which will effectively seal against substantial fluid pressure while providing good operating life.

It is a further object to provide a lip type pressure seal which will be effective and long-lasting while accommodating greater degrees of shaft runout than previous pressure seal designs.

Another object of the invention is to provide a seal which is relatively simplified in design and inexpensive to produce.

BRIEF DESCRIPTION OF THE DRAWINGS

A fuller understanding of the present invention will be gained by reference to the following detailed description when read in conjunction with the attached drawings in which.

DETAILED DESCRIPTION OF THE INVENTION

Figure 1:
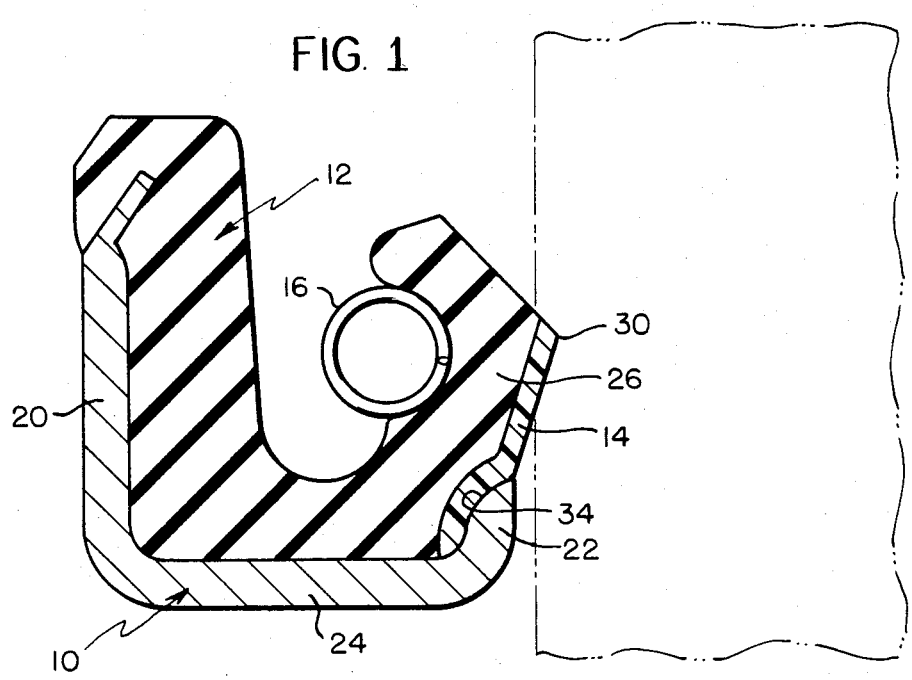
FIG. 1 is a partial cross-sectional view showing a preferred embodiment of a seal according to the invention in a ready-to-install configuration.

Referring now to the drawings, FIG. 1 shows a preferred embodiment of the invention including a metal shell 10, an elastomeric body 12, a low-friction lip liner 14 and a spring 16.

Shell 10 comprises a pair of generally cylindrical portions 20 and 22 and a generally radial portion 24, all forming shell 10 into a more or less U-shaped member. In most instances, shell portion 22 will be shorter in axial extent than portion 20. Elastomeric body 12 is also generally U-shaped and is bonded to cylindrical and radial portions 20 and 24 respectively of shell 10. Sealing portion 26 of elastomeric body 12 is bonded to low-friction liner 14 so that shell 10, body 12 and liner 14 constitute a unitary structure. Liner 14 extends generally axially from at least a sealing lip 30 along the sealing portion 26 of elastomeric body 12 to a point at least between the sealing portion 26 and shell portion 22 and preferably to a point in contact with radial portion 24 of shell 10. At all points of contact, the liner 14 is bonded to body 12, but nowhere is it bonded to shell 10. In this manner, the whole sealing portion 26 of elastomeric body 12 is more freely flexible in the radial direction while at the same time, shell portions 22 and 24 support sealing portion 26 against high internal pressure.

Cylindrical shell portion 22 is provided with a radiused surface 34 to prevent the liner 14 from contacting any sharp corners and to spread the flexing over a broader area and thus reduce stress fracturing.

Figure 2:
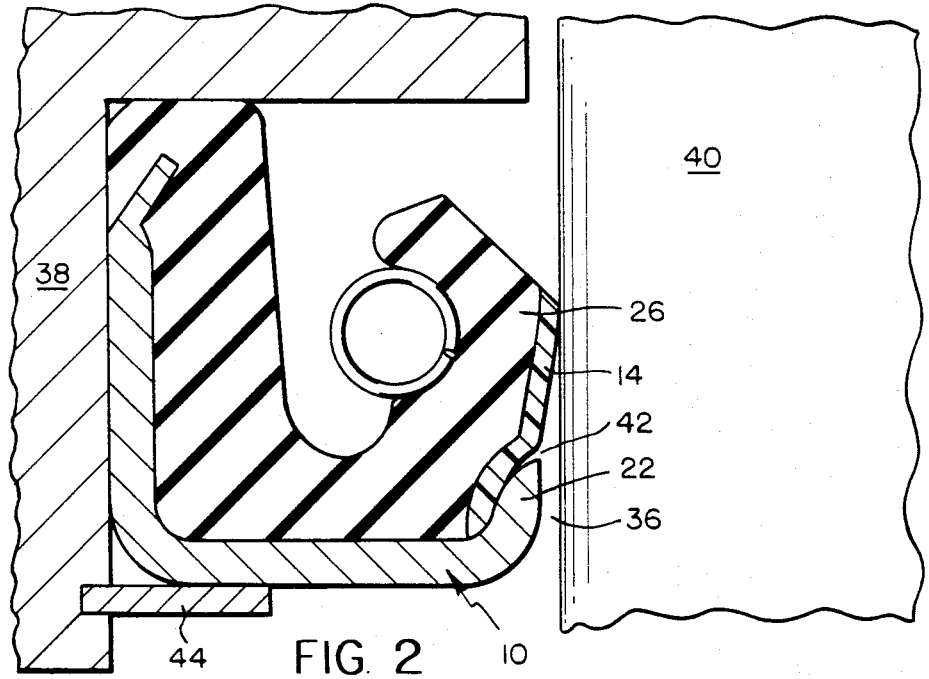
FIG. 2 is a partial cross-sectional view similar to FIG. 1 except that the seal is shown installed between a housing and a shaft.

In FIG. 2 the seal of the invention is shown in an installed configuration between a machine housing 38 and a relatively rotatable shaft 40 and with zero or very low internal pressure. As the seal is installed over shaft 40, sealing portion 26 flexes radially outwardly. Since liner 14 and shell 10 are nowhere bonded to one another, portion 26 is free to flex over its whole axial length and in zero or low pressure situations a gap 42 may be formed between cylindrical shell portion 22 and liner 14. Shell portion 22 should preferably have a shaft clearance or gap 36 not exceeding 0.040 inches on diameter and more preferably not exceeding 0.020 inches. The extent of shaft clearance will be governed by the extent of shaft runout anticipated and by the amount of fluid pressure to be sealed.

Figure 3:
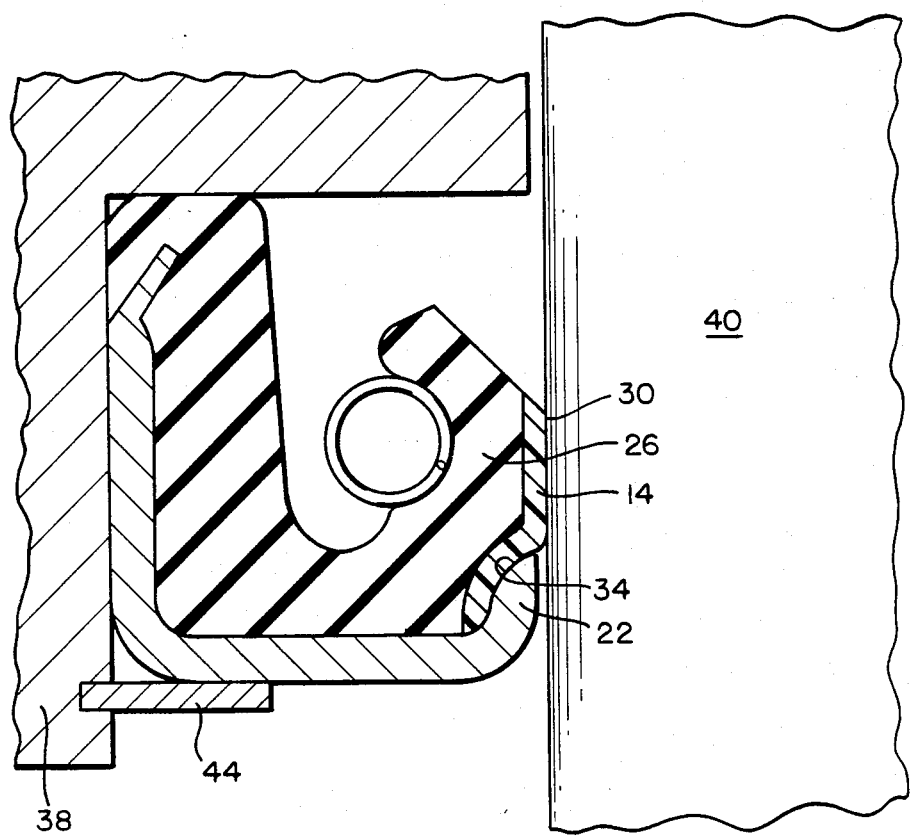
FIG. 3 is a view similar to that of FIG. 2 except that the seal is distorted to illustrate the effect of pressure.

In FIG. 3, the seal is gain shown in an installed configuration but with substantial internal pressure. Thus, the seal portion 26 is flexed radially inwardly and axially outwardly in reaction to the pressure and gap 42 as seen in FIG. 2 is totally closed. The shaft contact area or band of lip 30 is substantially increased, but the low-friction nature of the liner keeps wear at a minimum. Radiused surface 34 of shell portion 22 supports a portion of liner 14 but does not have a tendency to cut the liner. At the same time, since there is no bonding of the liner to the shell along surface 34, sealing portion 26 and liner 14 bonded thereto are flexible over their full axial extent. Thus, they are subject less to stress fractures and they are better able to compensate for shaft runout.

The metal shell 10 will most often be made of carbon steel but other metals and alloys such as brass, stainless steel and aluminum may be used. In a like manner, the elastomeric body 12 may most commonly be of nitrile compounds but other elastomers such as neoprene, fluoroelastomers and others will be used according to the various fluids to be sealed. Low-friction liner 14 is preferably made of polytetrafluoroethylene (PTFE) although other low-friction resins such as polyamides may be used. Finally, spring 16 may be of carbon steel or stainless steel.

In those installations where any substantial fluid pressure is to be retained, means should be provided to retain the seal in sealing position. For example, a snap ring 44 is shown in FIGS. 2 and 3 to retain the seal assembly in housing 38. Alternative means could be a plate attached to housing 38. Another alternative could be a relatively thick plate with an axially outwardly extending seal receiving bore. The seal would in this case be installed with shell portion 24 against the bottom of the seal receiving bore.

While the full, pressure sealing capabilities of the present invention have not yet been determined, experience thus far has shown good results in sealing pressures up to 2000 p.s.i. with low surface speed and rotary or oscillating shaft motion. At surface speeds on the order of 1000 feet per minute, pressures on the order of 100 p.s.i. have been sealed.

For the sake of convenience, there is illustrated a seal intended to be pressed into a housing bore and to seal against a rotary shaft. However, it is to be understood that the invention may be equally well embodied in a seal designed to be pressed onto a shaft or axle and to seal against a relatively rotatable housing. Also for convenience, the seal has been illustrated with a garter spring. However, other springs, such as stainless steel finger springs, may be used and under appropriate circumstances, it may be unnecessary to have any spring.

It is also to be noted that throughout the preceding description and the following claims, the terms generally cylindrical and generally axially extending, in reference to portions of the metal shell and the elastomeric body, are intended to encompass embodiments where there is something of a frustoconical bias, particularly in those parts which form and support the sealing portion.

While preferred embodiments of the invention have been shown and described in detail, other modifications will be readily apparent to those skilled in the art of shaft seals. Thus, the preceding specification should be interpreted as exemplary rather than as limiting and the scope of the invention is defined by the following claims.

I claim:

1. A lip type seal comprising
   (a) an annular generally U-shaped metal shell having a pair of generally cylindrical portions and a generally radial portion extending between ends of said cylindrical portions,
   (b) an elastomeric body bonded to said generally radial portion of said shell and
   (c) a low-friction lip liner bonded to a sealing portion of said elastomeric body at all points of contact therebetween and extending axially at least from a sealing lip, thence between said elastomeric body and one of said generally cylindrical shell portions and to a point adjacent to said radial portion of said shell, said low-friction liner being bonded only to said elastomeric body.

2. The seal according to claim 1 wherein one of said cylindrical portions of said shell is adapted to be press fitted into a machine housing and said other cylindrical shell portion is adapted to help to support said lip.

3. The seal according to claim 2 wherein said other cylindrical shell portion is located radially inwardly in relation to said one of said cylindrical portions.

4. The seal according to claim 3 wherein said other cylindrical shell portion is shorter than said one of said cylindrical portions.

5. The seal according to claim 1 wherein said lip liner extends to a point in contact with said radial portion of said shell.

6. The seal according to claim 2 wherein said elastomeric body is also bonded to that cylindrical shell portion which is adapted to be press fitted into a machine housing.

7. The seal according to claim 1 further comprising a spring adapted to maintain said sealing lip in sealing contact with a relatively rotatable machine element.

8. The seal according to claim 7 wherein said spring is a garter spring.

9. A lip type annular seal intended for sealing high pressures, said seal comprising:
   (a) a generally U-shaped metal shell member having a pair of generally cylindrical portions and a generally radial portion extending between ends of said cylindrical portions,
   (b) an elastomeric body bonded to said radially extending portion of said shell member and
   (c) a low-friction liner bonded only to a radially inner, generally cylindrical surface of said elastomeric body, said liner extending axially in one direction at least as far as the inner edge of a sealing lip and in the other axial direction to a position between a portion of said elastomeric body and a generally cylindrical portion of said shell positioned radially inwardly of said portion of said elastomeric body and said interposed portion of said low-friction liner.

10. The seal according to claim 9 wherein an outer cylindrical portion of said shell is adapted to be press fitted into a machine housing and said inner cylindrical portion of said shell is adapted to help to support said lip.

11. The seal according to claim 10 wherein said inner cylindrical shell portion is shorter than said outer cylindrical shell portion.

12. The seal according to claim 11 wherein said elastomeric body is also bonded to said outer cylindrical portion of said shell.

13. The seal according to claim 9 further comprising a spring adapted to maintain said sealing lip in sealing contact with a relatively rotatable shaft.

14. The seal according to claim 13 wherein said spring is a garter spring.

15. An apparatus including in combination
 (a) a machine housing having a seal receiving counterbore,
 (b) a relatively rotatable shaft and
 (c) a lip type seal comprising:
  (i) an annular generally U-shaped metal shell having a pair of generally cylindrical portions and a generally radial portion extending between ends of said cylindrical portions,
  (ii) an elastomeric body bonded to said generally radial portion of said shell and
  (iii) a low-friction lip liner bonded to a sealing portion of said elastomeric body at all points of contact therebetween and extending axially at least from a sealing lip, thence between said elastomeric body and one of said generally cylindrical shell portions and to a point adjacent to said radial portion of said shell, said low-friction liner being bonded only to said elastomeric body.

16. The apparatus of claim 15 further comprising means for retaining said seal in proper sealing position in said housing.

* * * * *